(12) United States Patent
Huang et al.

(10) Patent No.: US 11,611,759 B2
(45) Date of Patent: Mar. 21, 2023

(54) MERGE MODE CODING FOR VIDEO CODING

(71) Applicant: QUALCOMM Incorporated, San Diego, CA (US)

(72) Inventors: Han Huang, San Diego, CA (US); Wei-Jung Chien, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/879,462

(22) Filed: May 20, 2020

(65) Prior Publication Data
US 2020/0374528 A1  Nov. 26, 2020

Related U.S. Application Data

(60) Provisional application No. 62/852,516, filed on May 24, 2019.

(51) Int. Cl.
*H04N 19/159* (2014.01)
*H04N 19/70* (2014.01)
*H04N 19/119* (2014.01)
*H04N 19/139* (2014.01)

(52) U.S. Cl.
CPC ......... *H04N 19/159* (2014.11); *H04N 19/119* (2014.11); *H04N 19/139* (2014.11); *H04N 19/70* (2014.11)

(58) Field of Classification Search
CPC .... H04N 19/159; H04N 19/70; H04N 19/119; H04N 19/139; H04N 19/176; H04N 19/103; H04N 19/537; H04N 19/157; H04N 19/46; H04N 19/463; H04N 19/52;
(Continued)

(56) References Cited

U.S. PATENT DOCUMENTS

2020/0120334 A1* 4/2020 Xu ............... H04N 19/176
2020/0177873 A1* 6/2020 Li ............... H04N 19/119
2020/0344492 A1* 10/2020 Hsiao ............ H04N 19/52
(Continued)

FOREIGN PATENT DOCUMENTS

| WO | 2016008408 A1 | 1/2016 | |
| WO | 2020116456 A1 | 6/2020 | |
| WO | WO-2020256455 A1 * | 12/2020 | ........... H04N 19/105 |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
(Continued)

*Primary Examiner* — Richard A Hansell, Jr.
(74) *Attorney, Agent, or Firm* — Shumaker & Sieffert, P.A.

(57) ABSTRACT

An example device for coding video data determines for a first block of the video data whether to use a sub-block merge mode. Based on the determination not to use the sub-block merge mode for the first block, the device determines whether to use a merge mode with blending for the first block. Based on the determination to use the merge mode with blending for the first block, the device codes the first block with the merge mode with blending.

40 Claims, 14 Drawing Sheets

(58) Field of Classification Search
CPC .... H04N 19/96; H04N 19/105; H04N 19/107; H04N 19/109; H04N 19/11
See application file for complete search history.

(56) References Cited

U.S. PATENT DOCUMENTS

| | | | |
|---|---|---|---|
| 2020/0366901 A1* | 11/2020 | Ye | H04N 19/159 |
| 2021/0051335 A1* | 2/2021 | Liao | H04N 19/176 |
| 2021/0400294 A1 | 12/2021 | Chen et al. | |
| 2022/0078460 A1* | 3/2022 | Misra | H04N 19/44 |
| 2022/0086429 A1* | 3/2022 | Ko | H04N 19/105 |

OTHER PUBLICATIONS

Bross B., et al., "Versatile Video Coding (Draft 5)," Joint Video Experts Team (JVET) of ITU-T SG 16 WP 3 and ISO/IEC JTC 1/SC 29/WG 11, JVET-N1001-v5, 14th Meeting: Geneva, CH, Mar. 19, 2019-Mar. 27, 2019, No. JVET-N1001, May 14, 2019 (May 14, 2019), XP030205193, 370 pages, Retrieved from the Internet: URL:http://phenix.int-evry.fr/jvet/doc_end_user/documents/14_Geneva/wg11/JVET-N1001-v5.zip JVET-N1001-v5.docx, [retrieved on May 14, 2019] pp. 94-98, paragraph 7.4.6.3., cited in the application Section 8.5.6.4; p. 212-p. 214.

Bross B., et al., "Versatile Video Coding (Draft 8)," Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vA, 519 Pages.

Bross et al., "Versatile Video Coding (Draft 9)," Joint Video Experts Team (JVET) of ITU-T SG 16 WP 3 and ISO/IEC JTC 1/SC 29/WG 11, 18th Meeting: by teleconference Apr. 15-24, 2020, Document: JVET-R2001-v3, 523 Pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-TSG.16); URL: HTTP://PHENIX.INT-EVRY.FR/JVET/, No. JVET-A1001 Feb. 24, 2016 (Feb. 24, 2016), XP030150000, 27 pages.

Huang (QUALCOMM) H., et al., "Non-CE4: Merge Modes Signaling," 15. JVET Meeting, Jul. 3, 2019-Jul. 12, 2019, Gotherburg, (The Joint Video Exploration Team of ISO/IEC JTC1/SC29/WG11 and ITU-TSG.16), No. JVET-O0249, Jul. 8, 2019 (Jul. 8, 2019), XP030218970, pp. 1-10, Retrieved from the Internet: URL: http://phenix.int-evry.fr/jvet/doc_end_user/documets/15_Gothenburg/wg11/JVET-O0249-v8.zip JVET-O0249.pptx, [retrieved on Jul. 8, 2019], the whole document.

International Seach Report and Written Opinion—PCT/US2020/034002—ISAEPO—dated Jul. 14, 2020 (192990WO).

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

Lin P H (FOXCONN), et al., "CE3-1.7: Multiple-Model LM with Small Block Size Restriction," 126. MPEG Meeting, Mar. 25, 2019-Mar. 29, 2019, Geneva, CH, 14th Meeting, (Motion Picture Expert Group or ISO/IEC JTC1/SC29/WG11), No. m46924, Mar. 18, 2019 (Mar. 18, 2019), XP030209950, pp. 1-3, Retrieved from the Internet: URL: http://phenix.int-evry.fr/mpeg/doc_end_user/documents/126_Geneva/wg11/m46924-JVET-N0264-v2-JVET-N0264-v2.zip JVET-N0264-_draft.docx, [retrieved on Mar. 18, 2019], Section "7.3.6.7 Merge Data Syntax" on pp. 47-48, 3 pp.

Wang (QUALCOMM) H, et al., "CE10-related: Using Regular Merge Index Signaling for Triangle Mode," 13. JVET Meeting, Jan. 9, 2019-Jan. 18, 2019, Marrakech, MA (The Joint Video Exploration Team of ISO/IEC JTC1/SC29/WG11 and ITU-T SG.16), No. JVET-M0883, Jan. 14, 2019 (Jan. 14, 2019), XP030202180, 3 Pages, Retrieved from the Internet: URL:http://phenix.int-evry.fr/jvet/doc_end_user/documents/13_Marrakech/wg11/JVET-M0883-v1.zip JVET-M0883.docx [retrieved on Jan. 14, 2019], the whole document.

Wang (QUALCOMM) H., et al., "CE4-Related: Hybrid Merge Estimation Region," 125. MPEG Meeting, Jan. 9, 2019-Jan. 18, 2019, Marrakech, MA (Motion Picture Expert Group or ISO/IEC JTC1/SC29/WG11), No. m45784, Jan. 17, 2019 (Jan. 17, 2019), XP030214128, pp. 1-11, Retrieved from the Internet: URL: http://phenix.int-evry.fr/mpeg/doc_end_user/documents/125_Marrakech/wg11/m45784-JVET-M0507-v3-JVET-M0507.zip JVET-M0507_DraftText.docx, [retrieved on Jan. 17, 2019], Section "7.3.4.8, Merge data syntax" on pp. 37-38, 11 pp.

International Preliminary Report on Patentability—PCT/US2020/034002, The International Bureau of WIPO—Geneva, Switzerland, dated Dec. 2, 2021 10 Pages.

Bross B., et al., "Versatile Video Coding (Draft 5)", JVET-N1001-v6, Joint Video Experts Team (JVET) of ITU-T SG 16 WP 3 and ISO/IEC JTC 1/SC 29/WG 11, 14th Meeting, Geneva, CH, Mar. 19-27, 2019, 380 Pages.

Bross B., et al., "Versatile Video Coding (Draft 4)", 13. JVET Meeting, Jan. 9, 2019-Jan. 18, 2019, Joint Video Experts Team (JVET) of ITU-T SG 16 WP 3 and ISO/IEC JTC 1/SC 29/WG 11, JVET-M1001-v6,125. MPEG Meeting, Jan. 9, 2019-Jan. 18, 2019, Marrakech, MA, (Motion Picture Expert Group or ISO/IEC JTC1/SC29/WG11), No. m46627, 301 Pages. Mar. 9, 2019, XP030215564.

* cited by examiner

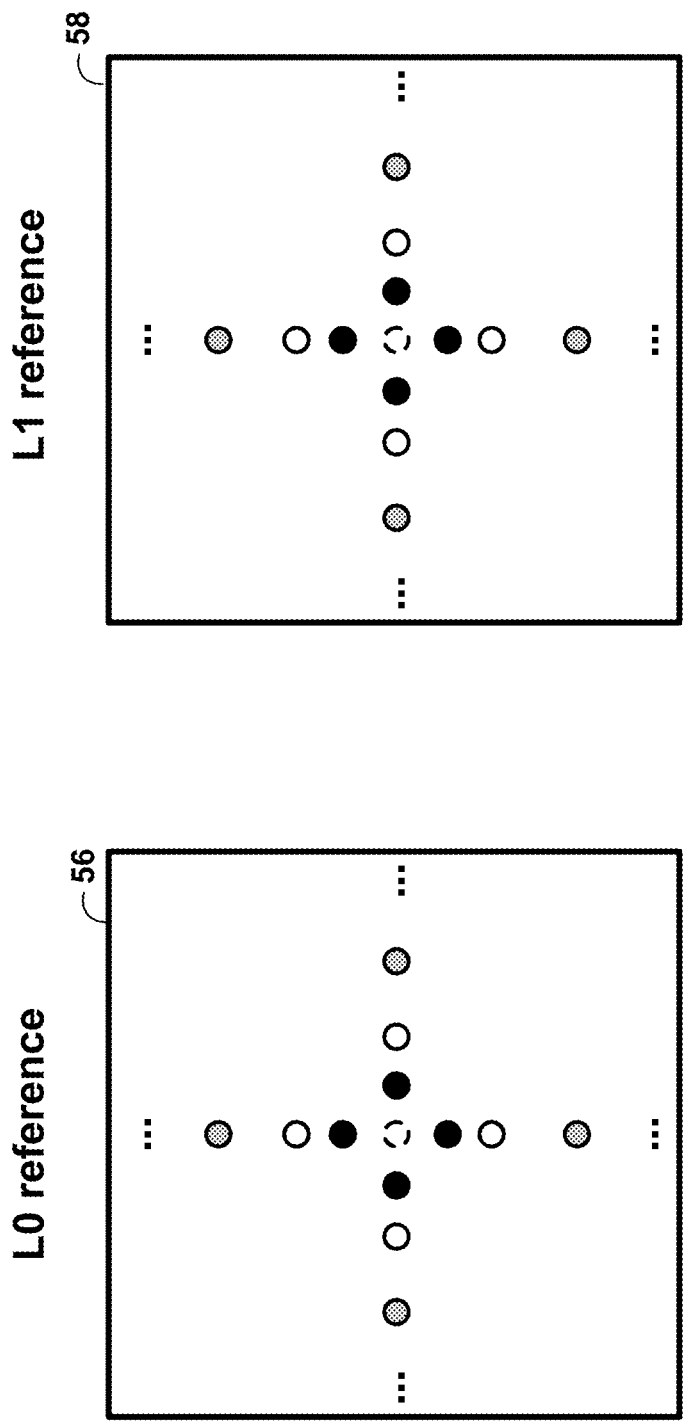

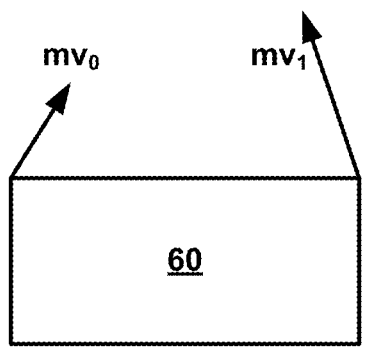 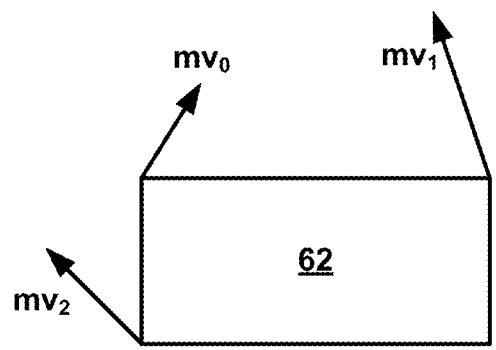
FIG. 8A            FIG. 8B
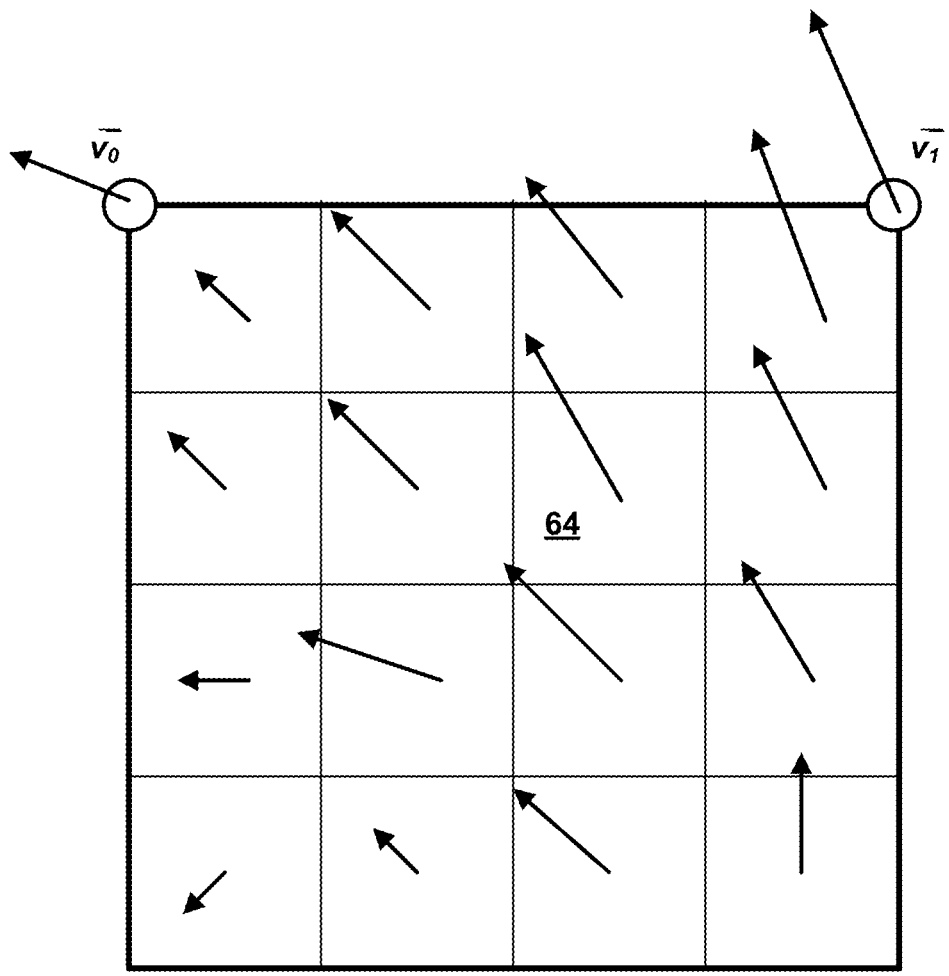
FIG. 9

MERGE MODE CODING FOR VIDEO CODING

This application claims the benefit of U.S. Provisional Patent Application No. 62/852,516, filed May 24, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining a type of merge mode for a current block of video data. For instance, this disclosure describes example techniques that a video encoder may utilize to signal information in an efficient manner indicative of different merge modes. A video decoder may parse the signaled information in an efficient manner to determine a type of merge mode to utilize for the current block.

In one example, a method of coding video data includes determining for a first block of the video data whether to use a sub-block merge mode; based on the determination not to use the sub-block merge mode for the first block, determining whether to use a merge mode with blending for the first block; and based on the determination to use the merge mode with blending for the first block, coding the first block with the merge mode with blending.

In one example, a device for coding video data includes a memory for storing the video data and one or more processors implemented in circuitry and communicatively coupled to the memory, the one or more processors being configured to: determine for a first block of the video data whether to use a sub-block merge mode; based on the determination not to use the sub-block merge mode for the first block, determine whether to use a merge mode with blending for the first block; and based on the determination to use the merge mode with blending for the first block, code the first block with the merge mode with blending.

In one example, a device for coding video data includes means for determining for a first block of the video data whether to use a sub-block merge mode, means for determining whether to use a merge mode with blending for the first block based on the determination not to use the sub-block merge mode for the first block, and means for coding the first block with the merge mode with blending based on the determination to use the merge mode with blending for the first block.

In one example, a non-transitory computer-readable storage medium stores instructions that, when executed, cause one or more processors to determine for a first block of video data whether to use a sub-block merge mode; based on the determination not to use the sub-block merge mode for the first block, determine whether to use a merge mode with blending for the first block; and based on the determination to use the merge mode with blending for the first block, code the first block with the merge mode with blending.

The details of one or more examples are set forth in the accompanying drawings and the description below. Other features, objects, and advantages will be apparent from the description, drawings, and claims.

BRIEF DESCRIPTION OF DRAWINGS

FIGS. 7A and 7B are conceptual diagrams illustrating examples of search point for merge mode with motion vector difference (MMVD).

FIGS. 8A and 8B are conceptual diagrams illustrating examples of 4-parameter affine model and 6-parameter affine model, respectively.

FIG. 9 is a conceptual diagram illustrating an example of affine motion vector (MV) field per sub-block.

DETAILED DESCRIPTION

In the current Versatile Video Coding (VVC) development, merge mode in the High Efficiency Video Coding (HEVC) standard has been extended, and several new merge modes have been adopted. The new merge modes include: Merge Mode with Motion Vector Difference (MMVD) (also referred to herein as the MMVD merge mode), Affine Merge Prediction (AMP), Sub-block-based Temporal Motion Vector Prediction (SbTMVP), Triangle Merge Prediction (TMP), and Combined Inter and Intra Prediction (CIIP).

Because of the new merge modes, a technical problem arises with how to efficiently signal information from a video encoder to a video decoder to indicate which merge mode is being used. For example, the more merge modes that were added required more bins to be used to signal all of the modes. Through arranging the order and structure of signaling in an efficient manner, this disclosure describes example techniques for a video encoder to signal information to a video decoder in a way that may lead to more efficient bandwidth utilization and reduced processing power consumption.

For example, merge modes may be categorized by type and higher probability merge modes may be placed higher in a binarization tree than lower probability merge modes, allowing for signaling of the higher probability merge modes with fewer bins than lower probability merge modes. In some examples, the example techniques may allow a video decoder to relatively quickly determine the merge mode type that was used by a video encoder to encode a given block of video data, which may reduce decoding latency. In this manner, the example techniques provide a practical application for addressing a technical problem that may improve video coding technology.

Figure 1:
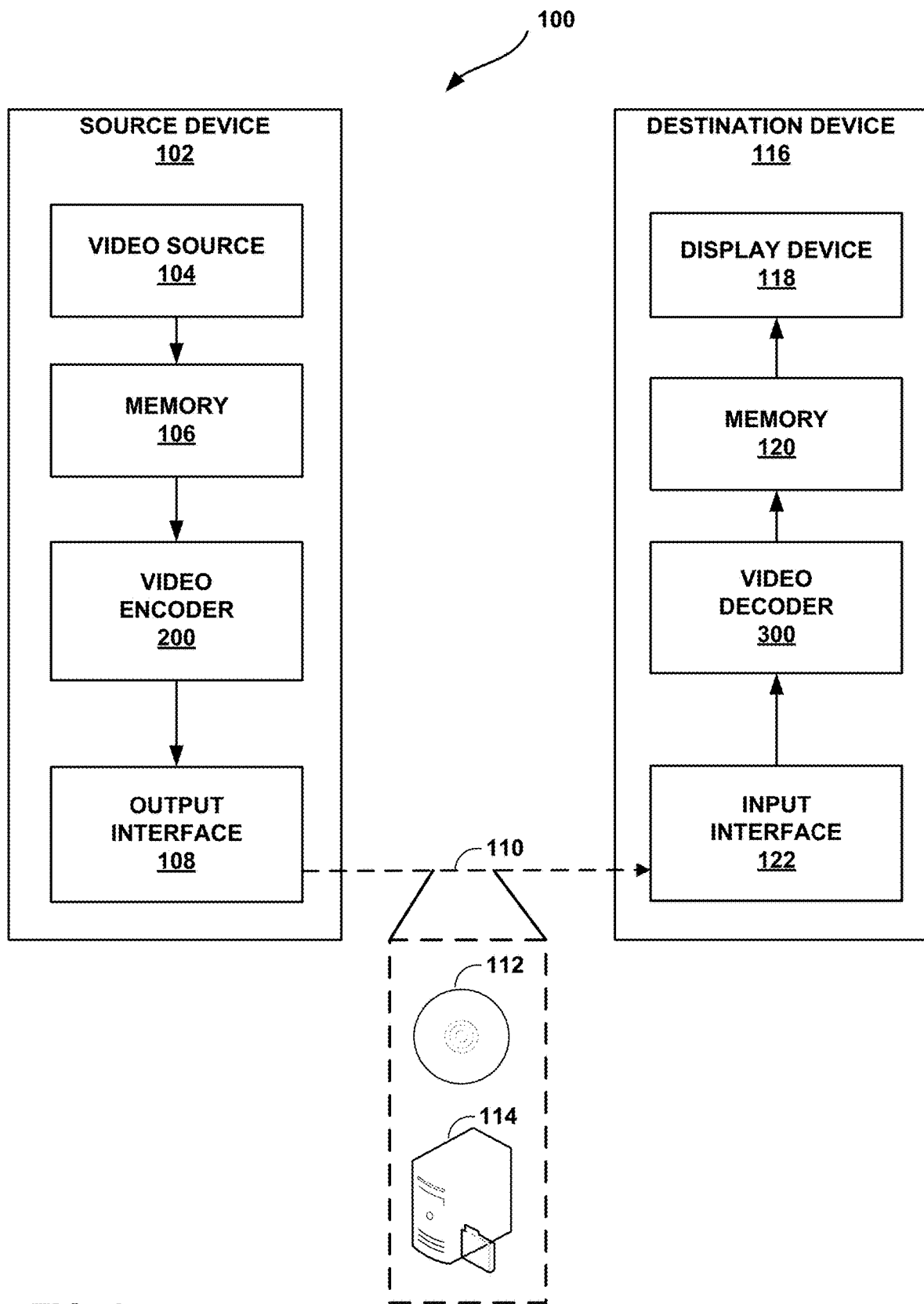
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding information for determining merge mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coding information determining merge mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable storage medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, JVET-N1001-v5 (hereinafter "VVC Draft 5"). A more recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18th Meeting: by teleconference, 15-24 Apr. 2020, JVET-R2001-v3. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 may determine a merge mode type (e.g., regular merge mode, Merge Mode with Motion Vector Difference (MMVD), Affine Merge Prediction (AMP), Sub-block-based Temporal Motion Vector Prediction (SbTMVP), Triangle Merge Prediction (TMP), or Combined Inter and Intra Prediction (CIIP)). Video encoder 200 may signal syntax elements in a bitstream to indicate a merge mode for a current block using any one or combination of techniques described in this disclosure. The examples of the syntax elements and the conditional order in which the syntax elements are signaled is described in more detail below.

Video decoder 300 may be configured to parse syntax elements in a bitstream to determine a merge mode for a current block using any one or combination of techniques described in this disclosure. The example of the syntax elements and the conditional order in which the syntax elements are parsed is described in more detail below.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
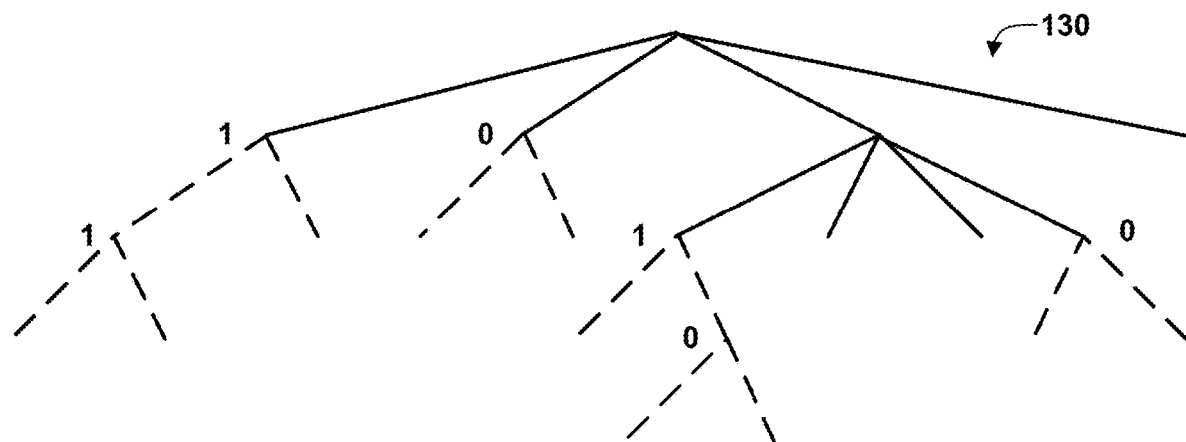
FIGS. 2A and 2B are conceptual diagrams illustrating an example quadtree binary tree (QTBT) structure, and a corresponding coding tree unit (CTU).
Figure 2B:
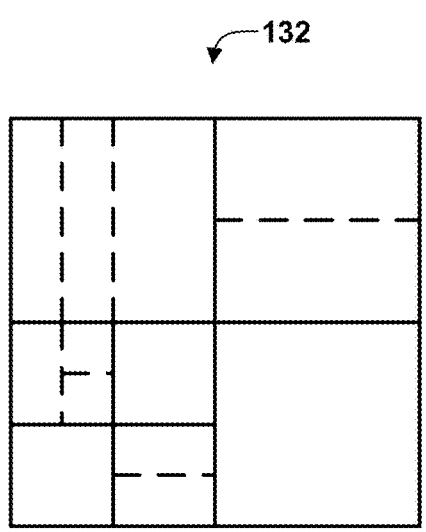

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

The following is a description of extended merge prediction. In the VVC Test Model 4 (VTM4), the merge candidate list is constructed by including the following five types of candidates in order: 1) Spatial merge candidates from spatial neighbor CUs; 2) Temporal merge candidate from collocated CUs; 3) History-based merge candidate from a First In First Out (FIFO) table; 4) Pairwise average merge candidate; and 5) Zero MVs.

The size of the merge candidate list is signaled in a slice header and the maximum allowed size of the merge candidate list is 6 in VTM4. For each CU coded in merge mode, an index of for the merge candidate is encoded using truncated unary binarization. The first bin of the merge index is coded with context, and bypass coding is used for the other bins. This merge mode is referred to herein as regular merge mode.

Figure 3:
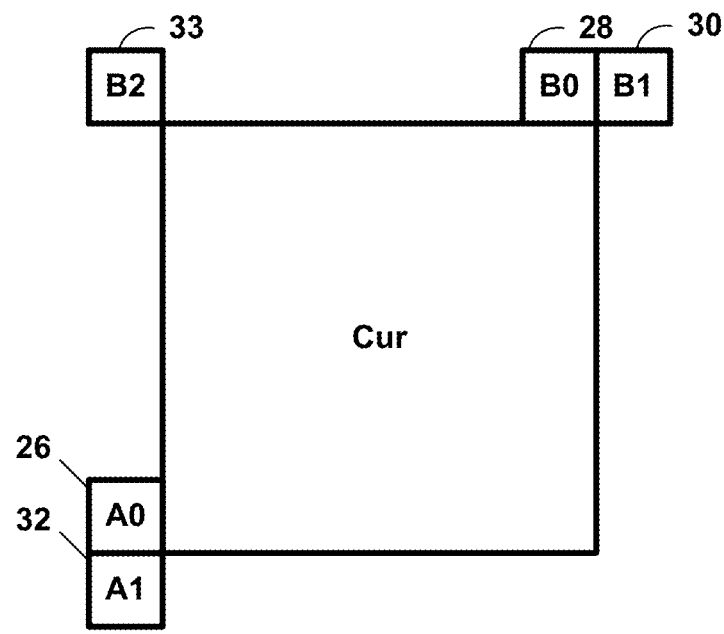
FIG. 3 is a conceptual diagram illustrating example positions of spatial merge candidates.
Figure 4:
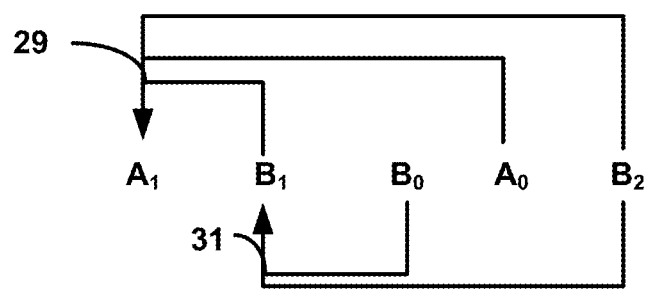
FIG. 4 is a conceptual diagram illustrating example of candidate pairs considered for redundancy check of spatial merge candidates.

The following describes spatial merge candidate derivation. FIG. 3 is a conceptual diagram illustrating example positions of spatial merge candidates. The derivation of spatial merge candidates in VVC is same as that in HEVC. A maximum of four merge candidates are selected among candidates located in the positions depicted in FIG. 3. The order of derivation is A0 26, B0 28, B1 30, A1 32 and B2 33. Position B2 33 is considered only when any CU of position A0 26, B0 28, B1 30, and A1 32 is not available (e.g., because it belongs to another slice or tile) or is intra coded. After candidate at position A1 32 is added, the addition of the remaining candidates is subject to a redundancy check which ensures that candidates with same motion information are excluded from the list so that coding efficiency is improved. For example, video encoder 200 or video decoder 300 may perform a redundancy check when adding candidates to the merge list. To reduce computational complexity, not all possible candidate pairs are considered in the mentioned redundancy check. FIG. 4 is a conceptual diagram illustrating an example of candidate pairs considered for the redundancy check of spatial merge candidates. Only the pairs linked with an arrow, e.g., arrow 29 or arrow 31, in FIG. 4 are considered and a candidate is only added to the list if the corresponding candidate used for redundancy check does not have the same motion information.

Figure 5:
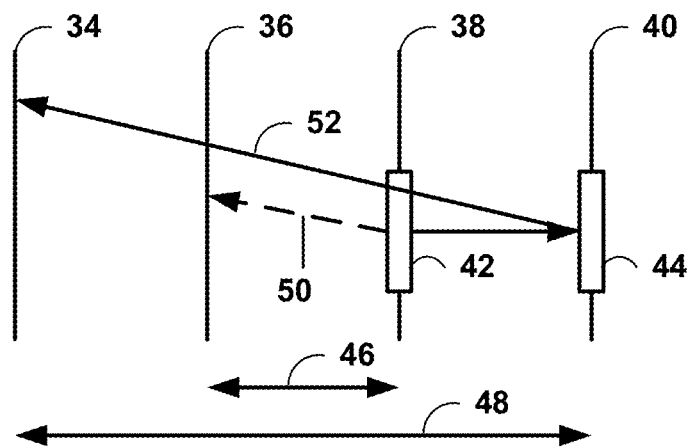
FIG. 5 is a conceptual diagram illustrating example of motion vector scaling for temporal merge candidate.

The following describes temporal candidate derivation. FIG. 5 is a conceptual diagram illustrating example of motion vector scaling for temporal merge candidate. In one example, only one temporal merge candidate is added to the merge list. In the derivation of this temporal merge candidate, a scaled motion vector is derived based on a co-located CU belonging to the collocated reference picture. The reference picture list (e.g., list0 or list1) to be used for derivation of the co-located CU is explicitly signaled in the slice header. For example, video encoder 200 may signal the reference picture list used for derivation of the co-located CU in a slice header in a bitstream, and video decoder 300 may determine the reference picture list by parsing the signaling in the bitstream.

Scaled motion vector 50 for a temporal merge candidate for current CU 42 is obtained as illustrated by the dashed line in FIG. 5, which is scaled from motion vector 52 of co-located CU 44 using the picture order count (POC) distances, tb 46 and td 48, where tb is defined to be the POC difference between the reference picture of the current picture (reference picture 36) and the current picture (current picture 38) and td is defined to be the POC difference between the reference picture of the co-located picture (reference picture 34) and the co-located picture (co-located picture 40). The reference picture index of the temporal merge candidate is set equal to zero.

Figure 6:
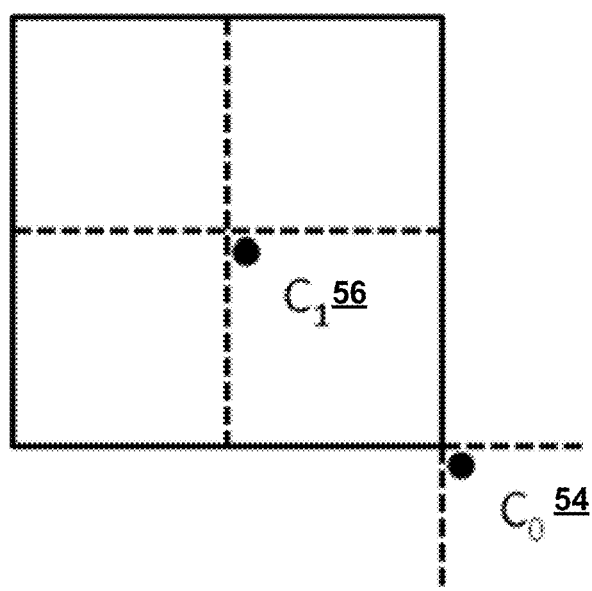
FIG. 6 is a conceptual diagram illustrating examples of candidate positions for temporal merge candidates.

FIG. 6 is a conceptual diagram illustrating examples of candidate positions for temporal merge candidates. The position for the temporal candidate is selected between candidates at position C0 54 and position C1 56, as depicted in FIG. 6. If the CU at position C0 54 is not available, is intra coded, or is outside of the current row of coding tree units (CTUs), the candidate at position C1 56 is used. Otherwise, position C0 54 is used in the derivation of the temporal merge candidate.

The following describes history-based merge candidate derivation. The motion information of a previously coded block is stored in a table (a history-based motion vector predictor (HMVP) table) and used as a motion vector predictor for the current CU. The HMVP table with multiple entries is maintained during the encoding/decoding process.

When inserting a new motion candidate to the HMVP table, video encoder 200 or video decoder 300 utilizes a constrained first-in-first-out (FIFO) rule wherein a redundancy check is first applied to find whether there is an identical candidate in the HMVP table. If found, the identical candidate is removed from the HMVP table and all the other candidates that follow in the HMVP table are moved forward in the HMVP table.

HMVP candidates are added to the merge candidate list after the spatial and temporal merge candidates, wherein the latest several HMVP candidates in the HMVP table are checked in order and inserted into the merge candidate list after the TMVP candidate. Some redundancy checks may be applied on the HMVP candidates before insertion into the merge candidate list. For example, video encoder 200 or video decoder 30 may perform redundancy checks on the HMVP candidates before inserting an HMVP candidate into the merge candidate list.

The following describes pair-wise average merge candidate derivation. Pairwise average candidates are generated by averaging predefined pairs of candidates in the existing merge candidate list. The averaged motion vectors are calculated separately for each reference picture list (e.g., list0 and list1). If both motion vectors are available in one list, these two motion vectors are averaged even when they point to different reference pictures. If only one motion vector is available, that motion vector is used directly without averaging. If no motion vector is available, the list is considered invalid and the pair-wise average merge candidate is not added.

When the merge list is not full after pair-wise average merge candidates are added, zero motion vector predictors are inserted in the end until the maximum merge candidate number is encountered.

The following describes merge mode with motion vector differences (MVDs) (MMVD). In addition to merge mode, where the implicitly derived motion information is directly used to generate prediction samples of the current CU, MMVD is introduced in VVC. In MMVD, video encoder 200 selects a merge candidate, video encoder 200 further refines the candidate by signaling MVDs information. The MVDs information includes a merge candidate flag, an index to specify motion magnitude, and an index for indication of motion direction. In MMVD mode, one of the first two candidates in the merge list is selected to be used as a starting MV. The merge candidate flag is signaled to specify which one of the first two candidates is the starting MV. For example, video encoder 200 may signal the merge candidate flag to specify to video decoder 300 which merge candidate to use as the starting MV.

A distance index specifies motion magnitude information and indicates the pre-defined offset from the starting MV. FIGS. 7A and 7B are conceptual diagrams illustrating examples of search point for merge mode with motion vector difference (MMVD).

As shown in FIGS. 7A and 7B, an offset is added to either a horizontal component or a vertical component of the starting MV. FIG. 7A depicts a plurality of L0 (list0) reference 56 offsets and FIG. 7B depicts a plurality of L1 (list1) reference 58 offsets. The relation of the distance index and the pre-defined offset is specified in Table 1-1.

TABLE 1-1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

A direction index represents the direction of the MVD relative to the starting point. The direction index can represent one of the four directions as shown in Table 1-2. The meaning of MVD sign may vary according to information regarding the starting MV(s). For example, when the starting MV(s) is a uni-prediction MV or bi-prediction MVs with both reference picture lists (list0 and list1) pointing to the same side of the current picture (i.e., POCs of the two reference pictures are both larger than the POC of the current picture, or are both smaller than the POC of the current picture), the sign in Table 1-2 specifies the sign of the MV offset added to the starting MV. When the starting MVs are bi-prediction MVs with the two MVs pointing to different sides of the current picture (i.e., the POC of one reference picture is larger than the POC of the current picture, and the POC of the other reference picture is smaller than the POC of the current picture), the sign in Table 1-2 specifies the sign of MV offset added to the list0 MV component of starting MV and the sign for the list1 MV component has an opposite value.

TABLE 1-2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

The following describes affine motion compensated prediction. In HEVC, only a translation motion model is applied for motion compensation prediction. While in the real world, there are many kinds of motion, e.g., zoom in/out, rotation, perspective motions and the other irregular motions. In the VTM4, a block-based affine transform motion compensation prediction is applied. FIGS. 8A and 8B are conceptual diagrams illustrating examples of a 4-parameter affine model and a 6-parameter affine model, respectively. As shown FIGS. 8A and 8B, the affine motion field of the block is described by motion information of two control point motion vectors (CPMVs) (4-parameter) (FIG. 8A) or three CPMVs (6-parameter) (FIG. 8B). In FIG. 8A the affine motion field of block 60 is described by two CPMVs (mv0 and mv1), while in FIG. 8B, the affine motion field of block 62 is described by three CPMVs (mv0, mv1 and mv2).

For the 4-parameter affine motion model, the motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (1)$$

Where $(mv_{0x}, mv_{0y})$ is motion vector of the top-left corner control point, $(mv_{1x}, mv_{1y})$ is motion vector of the top-right corner control point.

For the 6-parameter affine motion model, the motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2)$$

Where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

In order to simplify the motion compensation prediction, a sub-block based affine transform prediction is applied. FIG. 9 is a conceptual diagram illustrating an example of affine motion vector field per sub-block. In some examples, to derive motion vector of each 4×4 luma sub-block, the motion vector of the center sample of each sub-block, as shown in FIG. 9, is calculated according to above equations, and rounded to 1/16 fraction accuracy. For example, video encoder 200 and video decoder 300 may calculate the motion vector of the center sample of each-sub block, such as sub-block 64. Then the motion compensation interpolation filters are applied to generate the prediction of each sub-block with derived motion vector. In some examples, the sub-block size of chroma-components is also set to be 4×4. The MV of a 4×4 chroma sub-block is calculated as the average of the MVs of the four corresponding 4×4 luma sub-blocks.

The following describes affine merge prediction. In the affine merge mode, the CPMVs (control point motion vectors) of the current CU are generated based on the motion information of the spatial neighboring CUs. There can be up to five CPMV candidates and an index is signaled to indicate the one to be used for the current CU. For example, video encoder 200 may signal a CPMV index to video decoder 300 to indicate which CPMV candidate to use for the current CU. The following three types of CPVM candidates are used to form the affine merge candidate list: 1) inherited affine merge candidates that are extrapolated from the CPMVs of the neighbor CUs; 2) constructed affine merge candidates CPMVPs that are derived using the translational MVs of the neighbor CUs; and 3) zero MVs.

The following describes sub-block based temporal motion vector prediction (SbTMVP). Similar to the temporal motion vector prediction (TMVP) in HEVC, sub-block based temporal motion vector prediction (SbTMVP) uses the motion field in the collocated picture to improve motion vector prediction and merge mode for CUs in the current picture. The same collocated picture used by TMVP is used for SbTVMP. SbTMVP differs from TMVP in the following two main aspects: 1) TMVP predicts motion at CU level, but SbTMVP predicts motion at sub-CU level; and 2) whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector of one of the spatial neighboring blocks of the current CU.

A combined sub-block-based merge list which contains both SbTVMP candidates and affine merge candidates is used for the signaling of sub-block based merge mode. The combined sub-block-based merge list may be reconstructed by video decoder 300 and video encoder 200 may signal an index to the combined sub-block-based merge list to video decoder 300.

Figure 10A:
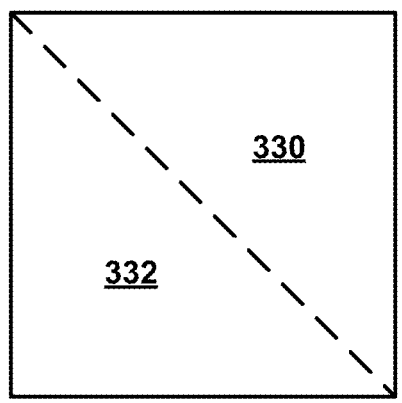
FIGS. 10A and 10B are conceptual diagrams illustrating example of triangle partition based inter prediction.
Figure 10B:
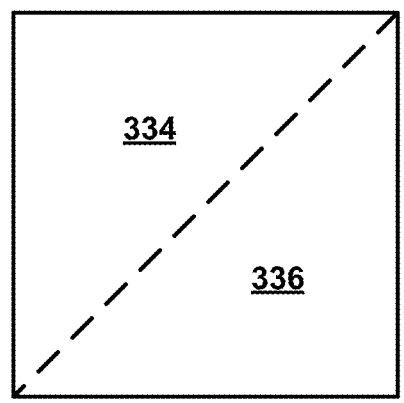

The following describes triangle merge prediction (TMP), which is an example of a geometric mode (e.g., non-rectangular blocks used for prediction). That is, TMP is an example of a merge mode using geometric shapes other than blocks. FIGS. 10A and 10B are conceptual diagrams illustrating example of triangle partition based inter prediction.

TMP is only applied to CUs that are 8×8 or larger. When this mode is used, a CU is split evenly into two triangle-shaped partitions, using either the diagonal split shown in FIG. 10A or the anti-diagonal split shown in FIG. 10B. TMP is a triangular mode in that TMP is based on triangular shapes, not blocks. The diagonal split in FIG. 10A divides the CU into partition 1 330 and partition 2 332. The anti-diagonal split in FIG. 10B divides the CU into partition 1 334 and partition 2 336. Each triangle partition in the CU is inter-predicted using its own motion information (e.g., motion vector and reference index). Only uni-prediction is allowed for each partition, that is, each partition has one motion vector and one reference index. The uni-prediction motion constraint is applied to ensure that, just as with conventional bi-prediction, only two motion compensated predictors are needed for each CU.

If triangle partition mode is used, then a flag indicating the direction of the triangle partition (diagonal or anti-diagonal), and two merge indices (one for each partition) are further signaled. For example, video encoder 200 may signal a flag indicating the direction of the split and the two merge indices to video decoder 300. After predicting each of the triangle partitions, the sample values along the diagonal or anti-diagonal edge are adjusted using a blending processing with adaptive weights. This is the prediction signal for the whole CU and the transform and quantization process will be applied to the whole CU as in other prediction modes.

The following describes combined inter and intra prediction (CIIP). In the combined inter/intra prediction (CIIP), an intra prediction mode and a regular merge candidate are first derived. Then, the intra prediction and inter prediction signals are derived using the derived intra mode and the merge candidate. The inter prediction signal $P_{inter}$ is derived using the same inter prediction process applied to regular merge mode, and the intra prediction signal $P_{intra}$ is derived using the CIIP intra prediction mode following the regular intra prediction process. Then, the intra and inter prediction signals are combined using weighted averaging as follows:

$$P_{CIIP}=((8-wt)*P_{inter}+wt*P_{intra}+4)>>3 \quad (3)$$

As stated above, this disclosure describes example techniques for signaling and parsing information for different merge modes (e.g., merge mode types). In a first example method, the different merge modes are categorized into 3 groups: 1) the normal merge mode group, which may include the regular merge mode and MMVD merge mode, 2) the sub-block based merge mode group, which may include SbTMVP mode and affine merge mode, and 3) the blending merge mode group, which may include geometric modes, such as the TMP mode, or other modes based upon geometries other than blocks, and CIIP mode, which require blending operations and may be referred to herein as merge modes with blending. By categorizing the merge modes by merge mode type and placing higher probability merge modes higher in a binarization tree, as described in this disclosure, relatively efficient signaling and parsing of merge mode types may be accomplished. The relatively efficient signaling and parsing may lead to more efficient bandwidth utilization and a reduction in processing power consumption and decoding latency.

Figure 11:
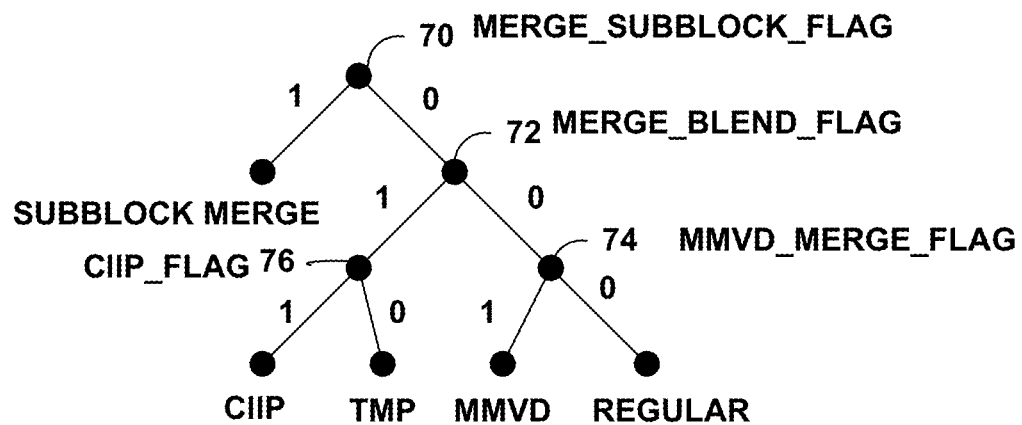
FIG. 11 is a conceptual diagram illustrating one example of a binarization tree for signaling merge mode information.

FIG. 11 is a conceptual diagram illustrating one example of a binarization tree for signaling merge mode information. Video encoder 200 may signal merge mode information according to the example of FIG. 11 to video decoder 300, and video decoder 300 may parse the merge mode information to determine which merge mode to apply. As shown in FIG. 11, a first flag, e.g., merge_sub-block_flag 70, is used to indicate whether the sub-block based merge mode group is selected. merge_sub-block_flag 70 being equal to 1 specifies that sub-block based merge mode is selected for the current block of video data, in which case video encoder 200 and video decoder 300 code the block of video data with a sub-block based merge mode. In the example of FIG. 11, a syntax element indicative of a sub-block based merge mode may be signaled first because a sub-block based merge mode may be more frequently utilized for many video sequences. In this manner selection of a sub-block based merge mode may be signaled in a single bin.

If merge_sub-block_flag 70 is not present, merge_sub-block_flag 70 is inferred to be 0. For example, if merge_sub-block_flag 70 is not present, video decoder 300 may infer merge_sub-block_flag 70 to be 0.

Accordingly, video encoder 200 and video decoder 300 may determine for a block of video data whether to use a sub-block merge mode. Video encoder 200 may signal merge_sub_block_flag 70 that indicates whether the block is to use the sub-block merge mode. Video decoder 300 may parse merge_sub_block_flag 70 to determine whether to use the sub-block merge mode, including infer that merge_sub_block_flag 70 is 0 based on parsing the bitstream and determining that merge_sub_block_flag 70 is not present.

If merge_sub-block_flag 70 is equal to 0, then a second flag, e.g., merge_blend_flag 72, is used to indicate whether the normal merge mode group or the blending merge mode group is selected. If merge_blend_flag 72 is not present, merge_blend_flag 72 is inferred to be 0. For example, merge_blend_flag 72 is not present, video decoder 300 may infer merge_blend_flag 72 to be 0.

For example, based on the determination not to use the sub-block merge mode for the block (e.g., because merge_sub-block_flag 70 is 0), video encoder 200 and video decoder 300 may determine whether to use a merge mode with blending for the block (e.g., such as CIIP or a geometric mode like TMP). In some examples, determining whether to use a merge mode with blending includes determining whether one of the geometric mode or the CIIP mode is to be used or neither of the geometric mode or the CIIP mode is to be used. For example, video encoder 200 may signal merge_blend_flag 72 that indicates whether the block is to use a merge mode with blending. Video decoder 300 may parse merge_blend_flag 72 to determine whether to use a merge mode with blending, including infer that merge_blend_flag 72 is 0 based on parsing the bitstream and determining that merge_blend_flag 72 is not present.

In one or more examples, video encoder 200 may signal merge_blend_flag 72 only after signaling merge_subblock_flag 70, and video decoder 300 may parse merge_blend_flag 72 only after parsing merge_subblock_flag 70.

If merge_blend_flag 72 is equal to 0, then a third flag, e.g., mmvd_merge_flag 74, is used to indicate whether regular merge mode or the MMVD merge mode is selected. If mmvd_merge_flag 74 is not present, mmvd_merge_flag 74 is inferred to be 0. For example, if mmvd_merge_flag 74 is not present, video decoder 300 may infer mmvd_merge_flag 74 to be 0.

For example, based on the determination not to use a merge mode with blending (e.g., because merge_blend_flag 72 is 0), video encoder 200 and video decoder 300 may determine whether to use the MMVD merge mode for the block. For example, video encoder 200 may signal mmvd_merge_flag 74 that indicates whether to use the MMVD merge mode for the block. Video decoder 300 may parse mmvd_merge_flag 74 to determine whether to use the MMVD merge mode, including infer that mmvd_merge_flag 74 is 0 based on parsing the bitstream and determining that mmvd_merge_flag 74 is not present.

In one or more examples, video encoder 200 may signal mmvd_merge_flag 74 only after signaling merge_subblock_flag 70 and merge_blend_flag 72 and video decoder 300 may parse mmvd_merge_flag 74 only after parsing merge_subblock_flag 70 and merge_blend_flag 72. For example, if mmvd_merge_flag 74 is equal to 1, that specifies that the MMVD merge mode is selected, in which case video encoder 200 and video decoder 300 code the block with the MMVD merge mode. If mmvd_merge_flag 74 is equal to 0, that specifies the regular merge mode is selected, in which case video encoder 200 and video decoder 300 code the block with regular merge mode.

If merge_blend_flag 72 is equal to 1, then a fourth flag, e.g., ciip_flag 76, is used to indicate whether the CIIP merge mode or a geometric mode, such as the TMP mode, is selected. If ciip_flag 76 is not present, ciip_flag 76 is inferred to be 0. For example, if ciip_flag 76 is not present, video decoder 300 may infer ciip_flag 76 to be 0.

For example, based on the determination to use a merge mode with blending (e.g., because merge_blend_flag 72 is 1), video encoder 200 and video decoder 300 may determine whether to use the CIIP mode or a geometric mode, such as TMP, for the block. For example, video encoder 200 may signal ciip_flag 76 that indicates whether the block is to use the CIIP mode for the block. Video decoder 300 may parse ciip_flag 76 to determine whether to use the CIIP mode, including infer that ciip_flag 76 is 0 based on parsing the bitstream and determining that ciip_flag 74 is not present. For example, if ciip_flag 76 is equal to 1, that means the CIIP mode is used, in which case video encoder 200 and video decoder 300 code the block with the CIIP mode. If ciip_flag 76 is equal to 0 and merge_blend_flag 72 is equal to 1, that means a geometric mode is used and video encoder 200 and video decoder 300 code the block with a geometric mode, such as TMP.

The flags (e.g., syntax elements) described above may be present depending on the availability of the corresponding merge modes. The merge_sub-block_flag may not be present if both SbTMVP and affine merge candidates are not available. The merge_blend_flag may not be present if both CIIP and TMP modes are not available. The ciip_flag may not be present if either CIIP or TMP mode is not available. The mmvd_merge_flag may not be present if MMVD merge mode is not available. Various condition checks may be applied (e.g., by video encoder 200 or video decoder 300) for the availability of those merge modes.

In one example, each merge mode has its own maximum number of candidates. In one example, all merge modes share the same maximum number of candidates. In one example, each different merge group has its own maximum number of candidates, but merge modes in the same group share the same number of merge candidates.

Figure 12:
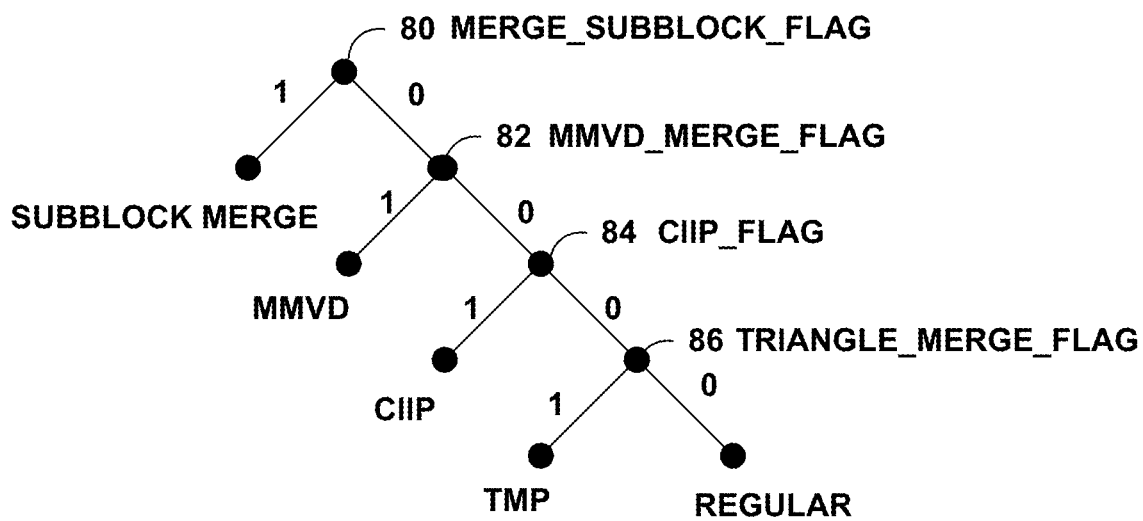
FIG. 12 is a conceptual diagram illustrating another example of a binarization tree for signaling merge mode information.

FIG. 12 is a conceptual diagram illustrating another example of a binarization tree for signaling merge mode information. Video encoder 200 may signal merge mode information according to the example of FIG. 12 to video decoder 300 and video decoder 300 may parse the merge mode information to determine which merge mode to apply. In the example of FIG. 12, a first flag, e.g., merge_sub-block_flag 80, is used to indicate whether sub-block based merge mode is selected. When merge_sub-block_flag 80 is equal to 1, the flag specifies that sub-block based merge mode is selected for the current CU. As in the example of FIG. 11, a syntax element indicative of a sub-block based merge mode may be signaled first because a sub-block based merge mode may be more frequently utilized for many video sequences. In this manner selection of a sub-block based merge mode may be signaled in a single bin. If merge_sub-block_flag is equal to 0, a second flag, e.g., mmvd_merge_flag 82, is used to indicate whether MMVD merge mode is selected. When mmvd_merge_flag 82 is equal to 1, the flag specifies that the MMVD merge mode is selected. If mmvd_merge_flag is equal to 0, a third flag, e.g., ciip_flag 84, is used to indicate whether CIIP mode is selected. When ciip_flag 84 is equal to 1, the flag specifies that the CIIP mode is selected. If ciip_flag 84 is equal to 0, then a fourth flag, e.g., triangle_merge_flag 86, is used to indicate whether the TMP mode is selected. When triangle_merge_flag 86 is equal to 1, the flag specifies that the TMP mode is selected. When triangle_merge_flag 86 is equal to 0, the flag specifies the regular merge mode is selected. Similar to the example of FIG. 11, the flags described above may be present depending on the availability of the corresponding merge modes. When a flag is not present, the flag is inferred to be 0. For example, if a flag is not present, video decoder 300 may infer the flag to be 0. In the example of FIG. 12, an additional bin is needed compared to the example of FIG. 11 to signal the last modes on the binarization tree.

The following describes merge index coding. For each merge mode, an index of best merge candidate is coded using truncated unary binarization. The first bin of the merge index is coded with context, and bypass coding is used for other bins. In one example, each merge mode has its own context for the first bin. In one example, the sub-block based merge mode has its own context, but all the other merge modes share the same context. In one example, the sub-block based merge mode has its own context, the MMVD merge mode also has its own context, and all the other merge modes share the same context. In one example, the CIIP and regular merge modes share the same context, but all the other merge modes have separate context.

The following describes availability check of different merge mode. Generally, the availability of a merge mode depends on the high-level syntax that control the on/off of the merge mode, and the constraint of block size to which the merge mode can be applied. In VTM4, different size constraints are applied to different merge modes. The regular merge mode and MMVD merge mode can be applied to all inter blocks. Sub-block based merge mode can be applied to inter blocks that have both width and height larger or equal to 8. CIIP can be applied to inter blocks that have the following conditions: area (N×M) is larger or equal to 64, width is less than or equal to maximum transform size, height is less than or equal to maximum transform size. TMP can be applied to inter blocks that have area larger or equal to 64.

In one example, the current size constraints for different merge modes are applied. In one example, the CIIP and TMP modes use the same size constraints. In one example, the following conditions are applied to both CIIP and TMP: area is larger or equal to 64, width is less than or equal to maximum transform size, height is less than or equal to maximum transform size. In another example, CIIP and TMP can both be applied to inter blocks that have area larger or equal to 64.

In one example, sub-block based merge mode can be applied to inter blocks that have area larger or equal to 64, and the following conditions are applied to both CIIP and TMP: area is larger or equal to 64, width is less than or equal to maximum transform size, height is less than or equal to maximum transform size. In one example, sub-block based merge mode, CIIP and TMP modes use the same size constraints. In one example, the following conditions are applied to sub-block-based merge mode, CIIP and TMP: area is larger or equal to 64, width is less than or equal to maximum transform size, height is less than or equal to maximum transform size. In one example, sub-block-based merge mode, CIIP and TMP can be applied to inter blocks that have area larger or equal to 64.

It should be understood that the number "64" in the above is an example of a threshold. Other values may also be utilized.

Figure 13:
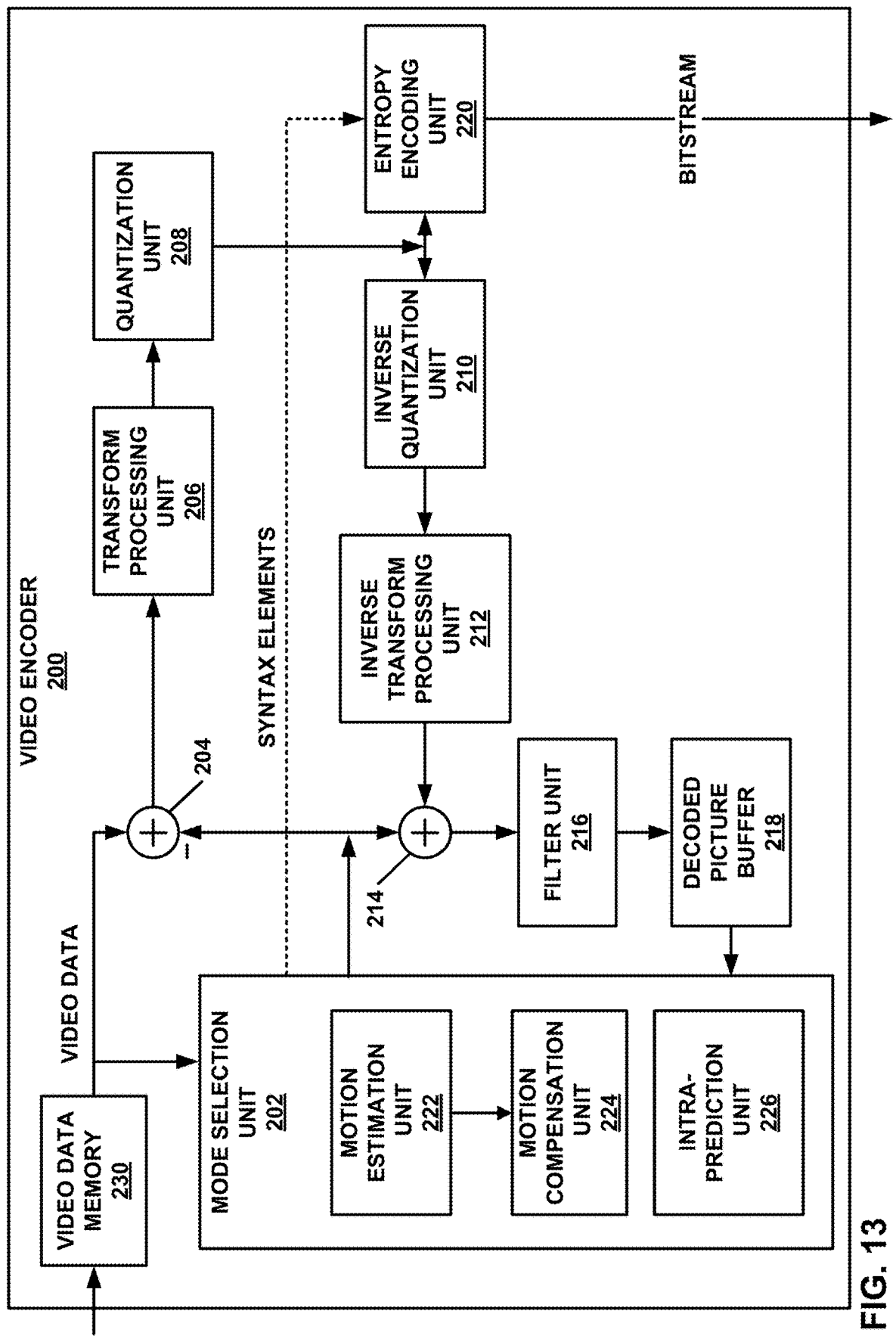
FIG. 13 is a block diagram illustrating an example video encoder that may perform the techniques of this disclosure.

FIG. 13 is a block diagram illustrating an example video encoder 200 that may perform the techniques of this disclosure. FIG. 13 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 13, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 13 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like. For some blocks, mode selection unit 202 may select a merge mode such as MMVD, AMP, SbTMVP, a geometric mode such as TMP, CIIP or regular merge mode. Video encoder 200 may signal the selected merge mode according to the techniques of this disclosure such as is described with respect to FIGS. 11, 12, and 15-17.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to determine for a first block of the video data whether to use a sub-block merge mode; based on the determination not to use the sub-block merge mode for the first block, determine whether to use a merge mode with blending for the first block; and based on the determination to use the merge mode with blending for the first block, encode the first block with the merge mode with blending.

Figure 14:
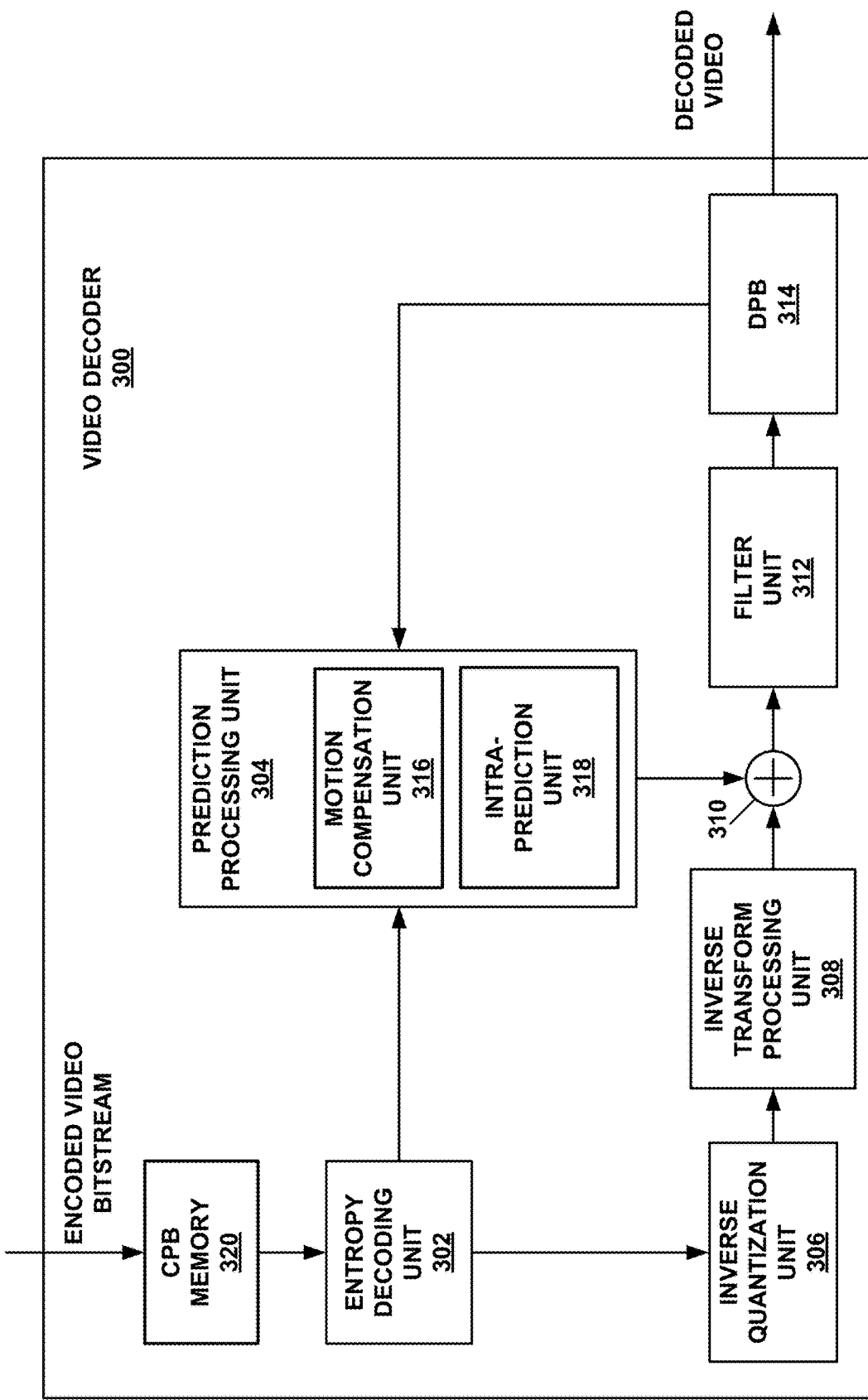
FIG. 14 is a block diagram illustrating an example video decoder that may perform the techniques of this disclosure.

FIG. 14 is a block diagram illustrating an example video decoder 300 that may perform the techniques of this disclosure. FIG. 14 is provided for purposes of explanation and is not limiting on the techniques as broadly exemplified and described in this disclosure. For purposes of explanation, this disclosure describes video decoder 300 is described according to the techniques of VVC and HEVC. However, the techniques of this disclosure may be performed by video coding devices that are configured to other video coding standards.

In the example of FIG. 14, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 14 are illustrated to assist with understanding the operations performed by video decoder 300. The units may be implemented as fixed-function circuits, programmable circuits, or a combination thereof. Similar to FIG. 13, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 13).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 13). Intra-prediction unit 318 may retrieve data of neighboring samples to the current block from DPB 314.

In some examples, the prediction information syntax elements indicate that the current block is predicted using a merge mode, such as MMVD, AMP, SbTMVP, a geometric mode such as TMP, CIIP or regular merge mode. Video decoder 300 may parse the prediction information syntax elements to determine the selected merge mode according to the techniques of this disclosure such as is described with respect to FIGS. 11, 12, and 15-17.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to parse syntax elements in a bitstream to determine a merge mode for a current block using any one or combination of techniques described in this disclosure.

Figure 15:
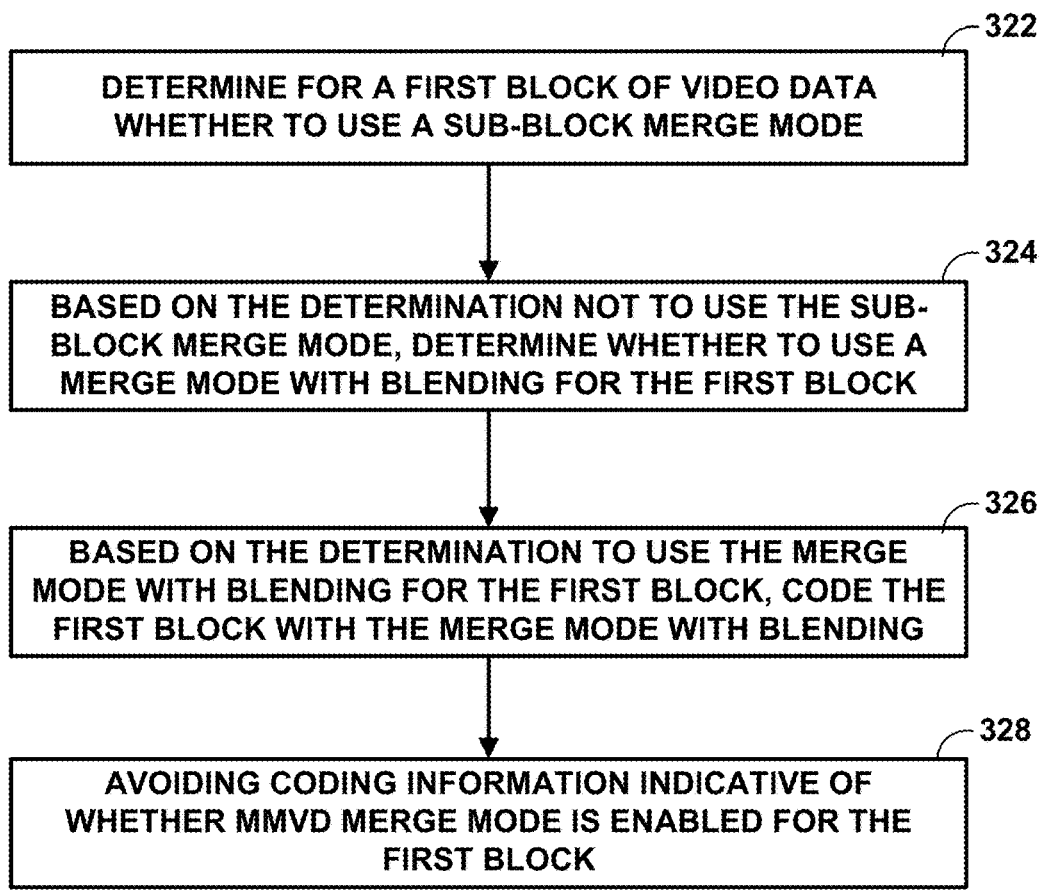
FIG. 15 is a flowchart illustrating example techniques for signaling or parsing syntax elements indicative of a merge mode selection.

FIG. 15 is a flowchart illustrating example techniques for signaling or parsing syntax elements indicative of a merge mode selection. In the example of FIG. 15, video encoder 200 or video decoder 300 may determine for a first block of video data whether to use a sub-block merge mode (322). For example, mode selection unit 202 of video encoder 200 may determine whether a sub-block merge mode is better than other tested modes for the first block. Video encoder 200 may signal a syntax element, such as merge_subblock_flag 70, indicative as to whether to use a sub-block merge mode to video decoer 300. Video decoder 300 may parse the signaled syntax element to determine whether to use the sub-block merge mode. In some examples, the sub-block merge mode may be the SbTMVP mode or the affine merge mode.

Based on the determination not to use the sub-block merge mode (e.g., merge_subblock_flag 70 equals 0), video encoder 200 or video decoder 300 may determine whether to use a merge mode with blending for the first block (324). For example, mode selection unit 202 of video encoder 200 may determine whether a merge mode with blending is better than other tested modes for the first block. Video encoder 200 may signal a syntax element, such as merge_blend_flag 72, indicative as to whether to use a merge mode with blending to video decoer 300. Video decoder 300 may parse the signaled syntax element to determine whether to use the merge mode with blending. In some example, the merge mode with blending may be a geometric mode, such as TMP mode, or other mode based upon geometries other than blocks, or CIIP mode.

Based on the determination to use a merge mode with blending (e.g., merge_blend_flag 72 equals 1) for the first block, video encoder 200 or video decoder 300 may code the first block with the merge mode with blending (326). In some examples, video encoder 200 and video decoder 300 may avoid coding information indicative of whether the MMVD merge mode is enabled for the first block. For example, video encoder 200 may not signal a syntax element, such as mmvd_merge_flag 74, indicative of whether the MMVD merge mode is enabled for the first block and video decoder 300 may not parse a syntax element indicative of whether the MMVD merge mode is enabled for the first block. According to the techniques of this disclosure, a syntax element indicative of whether MMVD merge mode is enabled for the first block is unnecessary as merge_blend_flag 72 appears before mmvd_merge_flag 74 in the example binarization tree of FIG. 11.

In some examples, the determination whether to use the merge mode with blending includes determining whether to use the merge mode with blending at least partially based on a size of the first block. For example, the first block may have a size of N×M. The determination of whether to use the merge mode with blending may be at least partially based on the first block having a size N×M that is greater than or equal to a predetermined number, such as 64.

In some examples, coding includes encoding and video encoder 200 signals a syntax element in a bitstream indicative of using the merge mode with blending for the first block after signaling a syntax element in the bitstream indicative that the sub-block merge mode for the first block is not to be used. In some examples, coding includes decoding and video decoder 300 parses the syntax element in the bitstream that is indicative of using the merge mode with blending for the first block after parsing a syntax element in the bitstream indicative that the sub-block merge mode for the first block is not to be used.

Figure 16:
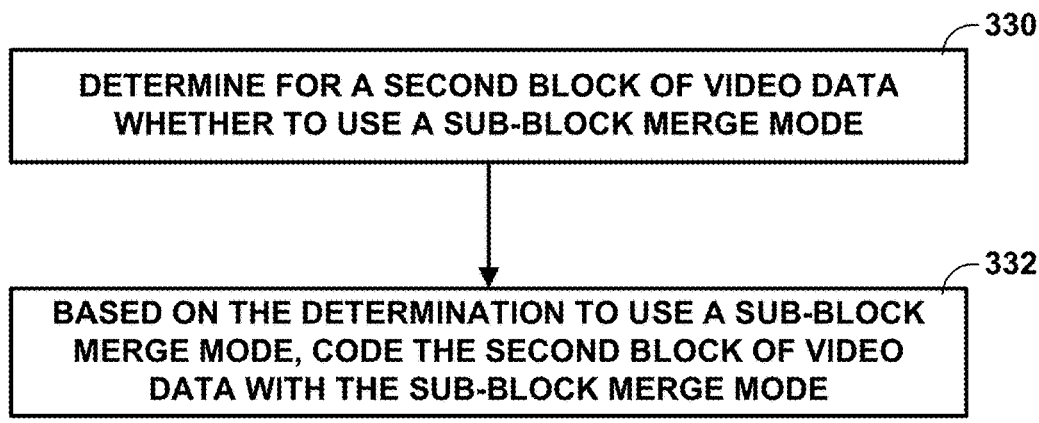
FIG. 16 is a flowchart illustrating further example techniques for signaling or parsing syntax elements indicative of a merge mode selection.

FIG. 16 is a flowchart illustrating further example techniques for signaling or parsing syntax elements indicative of a merge mode selection. The example of FIG. 16 may be used with the example of FIG. 15.

In the example of FIG. 16, video encoder 200 or video decoder 300 may determine for a second block of video data whether to use a sub-block merge mode (330). For example, mode selection unit 202 of video encoder 200 may determine whether a sub-block merge mode is better than other tested modes for the second block. Video encoder 200 may signal a syntax element, such as merge_subblock_flag 70, indicative of whether to use a sub-block merge mode to video decoer 300. Video decoder 300 may parse the signaled syntax element to determine whether to use the sub-block merge mode. In some examples, the sub-block merge mode may be the SbTMVP mode or the affine merge mode. Based on the determination to use a sub-block merge mode (e.g., merge_subblock_flag 70 equals 1) for the second block, video encoder 200 or video decoder 300 may code the second block with the sub-block merge mode (332).

Figure 17:
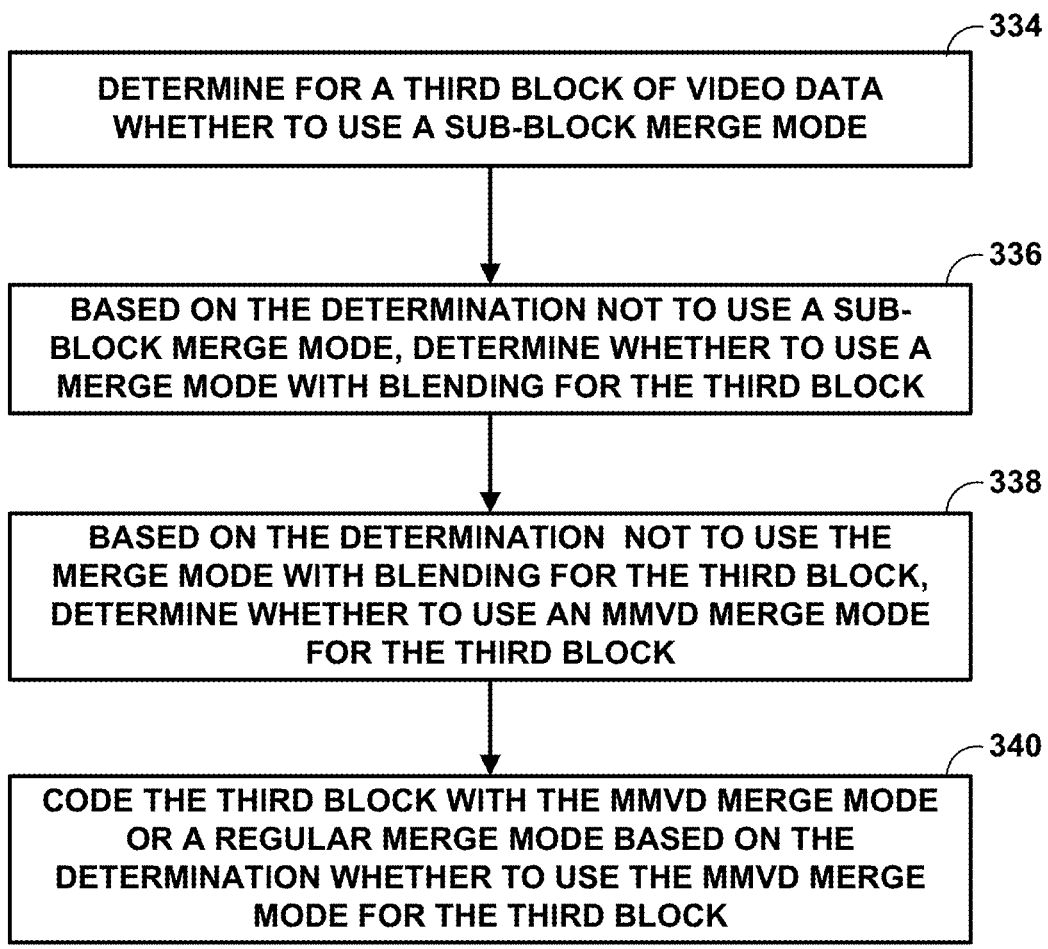
FIG. 17 is a flowchart illustrating further example techniques for signaling or parsing syntax elements indicative of a merge mode selection.

FIG. 17 is flowchart illustrating further example techniques for signaling or parsing syntax elements indicative of a merge mode selection. The example of FIG. 17 may be used with the example of FIG. 15 and/or the example of FIG. 16.

In the example of FIG. 17, video encoder 200 or video decoder 300 may determine for a third block of video data whether to use a sub-block merge mode (334). For example, mode selection unit 202 of video encoder 200 may determine whether a sub-block merge mode is better than other tested modes for the third block. Video encoder 200 may signal a syntax element, such as merge_subblock_flag 70, indicative of whether to use a sub-block merge mode to video decoer 300. Video decoder 300 may parse the signaled syntax element to determine whether to use the sub-block merge mode. In some examples, the sub-block merge mode may be the SbTMVP mode or the affine merge mode.

Based on the determination not to use the sub-block merge mode (e.g., merge_subblock_flag 70 equals 0), video encoder 200 or video decoder 300 may determine whether to use a merge mode with blending for the third block (336). For example, mode selection unit 202 of video encoder 200 may determine whether a merge mode with blending is better than other tested modes for the third block. Video encoder 200 may signal a syntax element, such as merge_blend_flag 72, indicative of whether to use a merge mode with blending to video decoer 300. Video decoder 300 may parse the signaled syntax element to determine whether to use the merge mode with blending. In some examples, the merge mode with blending may be a geometric mode, such as TMP mode, or other mode based upon geometries other than blocks, or CIIP mode.

Based on the determination not to use a merge mode with blending (e.g., merge_blend_flag 72 equals 0) for the third block, video encoder 200 or video decoder 300 may determine whether to use an MMVD merge mode for the third block (338). For example, mode selection unit 202 of video encoder 200 may determine whether the MMVD merge mode is better than other tested modes for the third block. Video encoder 200 may signal a syntax element, such as mmvd_merge_flag 74, indicative of whether to use the MMVD merge mode to video decoer 300. Video decoder 300 may parse the signaled syntax element to determine whether to use the MMVD merge mode. Video encoder 200 or video decoder 300 may code the third block with the MMVD merge mode (e.g., mmvd_merge_flag 74 equals 1) or a regular merge mode (e.g., mmvd_merge_flag 74 equals 0) based on the determination whether to use the MMVD merge mode for the third block.

The example techniques of FIGS. 15-17 may enable a video encoder to signal merge mode information to a video decoder in a way that may lead to more efficient bandwidth utilization and reduced processing power consumption. In some examples, the example techniques may allow a video decoder to relatively quickly determine the merge mode type that was used by a video encoder to encode a given block of video data, which may reduce decoding latency.

Figure 18:
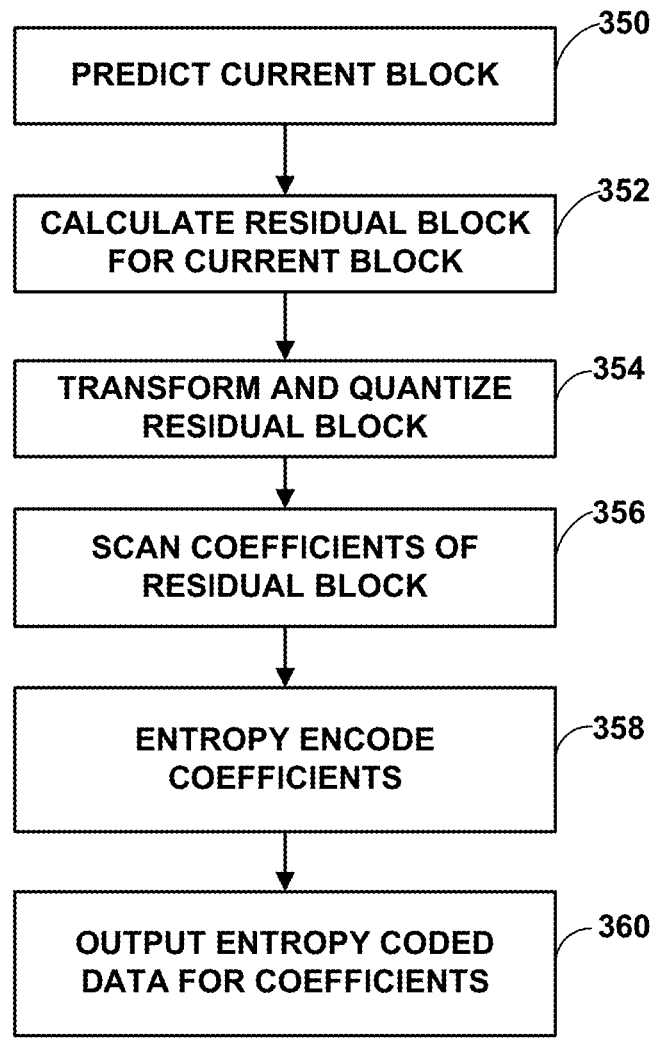
FIG. 18 is a flowchart illustrating an example of encoding video data.

FIG. 18 is a flowchart illustrating an example method for encoding a current block. The current block may comprise a current CU. Although described with respect to video encoder 200 (FIGS. 1 and 13), it should be understood that other devices may be configured to perform a method similar to that of FIG. 18.

In this example, video encoder 200 initially predicts the current block (350). For example, video encoder 200 may form a prediction block for the current block. In the forming of the prediction block, video encoder may utilize any of the techniques of FIGS. 15-17. For example, video encoder 200 may determine for a first block of video data whether to use a sub-block merge mode. Based on the determination not to use the sub-block merge mode, video encoder 200 may determine whether to use a merge mode with blending for the first block. Based on the determination to use a merge mode with blending for the first block, video encoder 200 may code the first block with the merge mode with blending. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 19:
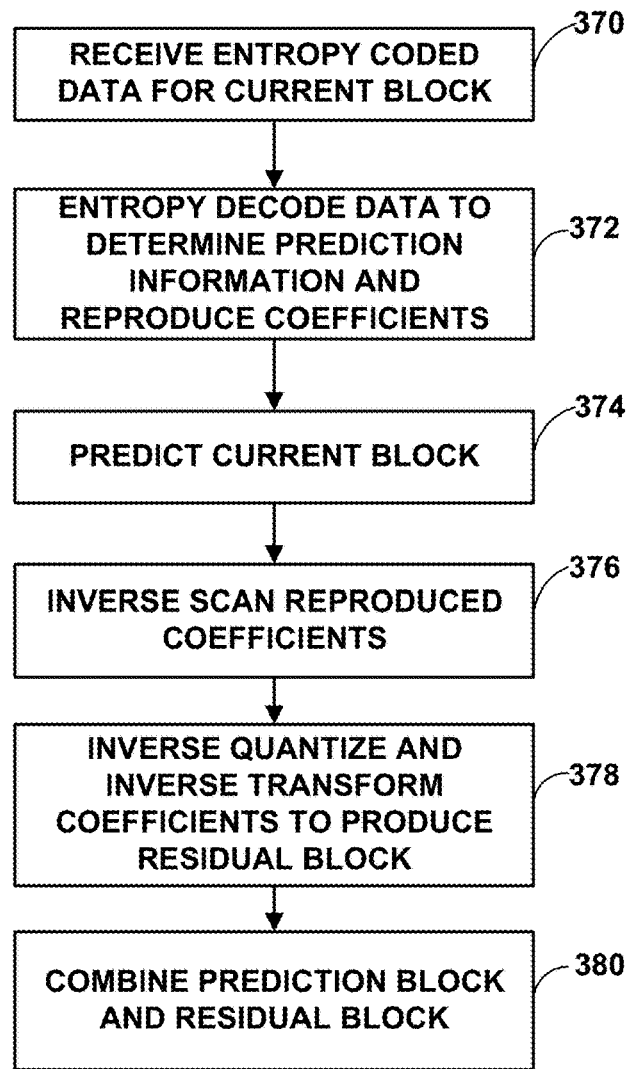
FIG. 19 is a flowchart illustrating an example of decoding video data.

FIG. 19 is a flowchart illustrating an example method for decoding a current block of video data. The current block may comprise a current CU. Although described with respect to video decoder 300 (FIGS. 1 and 14), it should be understood that other devices may be configured to perform a method similar to that of FIG. 19.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. When predicting the current block, video decoder 300 may utilize any of the techniques of FIGS. 15-17. For example, video decoder 300 may determine for a first block of video data whether to use a sub-block merge mode. Based on the determination not to use the sub-block merge mode, video decoder 300 may determine whether to use a merge mode with blending for the first block. Based on the determination to use a merge mode with blending for the first block, video decoder 300 may code the first block with the merge mode with blending. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

According to the techniques of the present disclosure, a video encoder may signal merge mode information to a video decoder in a way that may lead to more efficient bandwidth utilization and reduced processing power consumption. For example, merge modes may be categorized by type and higher probability merge modes may be placed higher in a binarization tree than lower probability merge modes, allowing for signaling of the higher probability merge modes with fewer bins than lower probability merge modes. In some examples, the example techniques may allow a video decoder to relatively quickly determine the merge mode type that was used by a video encoder to encode a given block of video data, which may reduce decoding latency. In this manner, the example techniques provide a practical application for addressing a technical problem that may improve video coding technology.

This disclosure includes the following examples.

Example 1. A method of decoding video data, the method comprising: parsing syntax elements in a bitstream to determine a merge mode for a current block using any one or combination of techniques described in this disclosure.

Example 2. A method of encoding video data, the method comprising: signaling syntax elements in a bitstream to indicate a merge mode for a current block using any one or combination of techniques described in this disclosure.

Example 3. A method of decoding video data, the method comprising: parsing a first syntax element in a bitstream to determine whether sub-block based merge mode group is selected; based on a value of the first syntax element, determining that sub-block based merge mode group is selected for a current block; and decoding a current block using sub-block based merge mode.

Example 4. A method of decoding video data, the method comprising: parsing a first syntax element in a bitstream to determine whether sub-block based merge mode group is selected; based on a value of the first syntax element, determining that sub-block based merge mode group is not selected for a current block; based on sub-block based merge mode group not being selected, parsing a second syntax element in the bitstream to determine whether normal merge mode group or blending merge mode group is selected; based on a value of the second syntax element, parsing a third syntax element in the bitstream to determine whether regular merge mode or merge mode with motion vector difference (MMVD); based on a value of the third syntax element, determining that MMVD is selected; and decoding a current block using MMVD.

Example 5. A method of decoding video data, the method comprising: parsing a first syntax element in a bitstream to determine whether sub-block based merge mode group is selected; based on a value of the first syntax element, determining that sub-block based merge mode group is not selected for a current block; based on sub-block based merge mode group not being selected, parsing a second syntax element in the bitstream to determine whether normal merge mode group or blending merge mode group is selected; based on a value of the second syntax element, parsing a third syntax element in the bitstream to determine whether regular merge mode or merge mode with motion vector difference (MMVD); based on a value of the third syntax element, determining that regular merge mode is selected; and decoding a current block using regular merge mode.

Example 6. A method of decoding video data, the method comprising: parsing a first syntax element in a bitstream to determine whether sub-block based merge mode group is selected; based on a value of the first syntax element, determining that sub-block based merge mode group is not selected for a current block; based on sub-block based merge mode group not being selected, parsing a second syntax element in the bitstream to determine whether normal merge mode group or blending merge mode group is selected; based on a value of the second syntax element parsing a fourth syntax element in the bitstream to determine whether combined inter and intra prediction (CIIP) is selected or triangle merge prediction (TMP) is selected; and decoding a current block using one of CIIP or TMP based on a value of the fourth syntax element.

Example 7. A method of decoding video data, the method comprising: determining that sub-block based merge mode is not selected based on a value of a first syntax element; based on sub-block based merge mode not being selected, parsing a second syntax element indicating whether merge mode with motion vector difference (MMVD) is selected; and decoding a current block using MMVD based on the second syntax element indicating that MMVD is selected.

Example 8. A method of decoding video data, the method comprising: determining that sub-block based merge mode is not selected based on a value of a first syntax element and merge mode with motion vector difference (MMVD) is not selected based on a value of a second syntax element; based on the sub-block based merge mode and the MMVD not being selected, parsing a third syntax element indicating whether combined inter and intra prediction (CIIP) is selected; and decoding a current block using CIIP based on the third syntax element indicating that CIIP is selected.

Example 9. A method of decoding video data, the method comprising: determining that sub-block based merge mode is not selected based on a value of a first syntax element, merge mode with motion vector difference (MMVD) is not selected based on a value of a second syntax element, and combined inter and intra prediction (CIIP) is not selected based on a value of a third syntax element; based on the sub-block based merge mode, the MMVD, and CIIP not being selected, parsing a fourth syntax element indicating whether triangle merge prediction is selected, wherein a first value of the fourth syntax element indicates that triangle merge prediction is selected and a second value of the fourth syntax element indicates that regular merge mode is selected; and decoding a current block using triangle merge prediction or regular merge mode based on whether a value of the fourth syntax element is the first value or the second value.

Example 10. A method encoding video data, the method comprising: determining a merge mode type for a current block; and signaling syntax elements according to a manner in which syntax elements are parsed in any of examples 3-9 based on the merge mode type.

Example 11. A device for decoding video data, the device comprising: a memory to store video data; and a video decoder comprising at least one of fixed-function or programmable circuitry, wherein the video decoder is configured to perform the method of any of examples 3-9.

Example 12. A device for encoding video data, the device comprising: a memory to store video data; and a video encoder comprising at least one of fixed-function or programmable circuitry, wherein the video encoder is configured to perform the method of example 10.

Example 13. The device of any of examples 11 and 12, wherein the device comprises at least one of a camera or a display.

Example 14. The device of any of examples 11-13, wherein the device is one or more of a camera, a computer, a mobile device, a broadcast receiver device, or a set-top box.

Example 15. A device decoding video data, the device comprising means for perform the method of any of examples 3-9.

Example 16. A computer-readable storage medium storing instructions thereon that when executed cause one or more processors of a device for decoding video data to perform the method of any of examples 3-9.

Example 17. A device encoding video data, the device comprising means for perform the method of example 10.

Example 18. A computer-readable storage medium storing instructions thereon that when executed cause one or more processors of a device for encoding video data to perform the method of example 10.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining for a first block of the video data whether to use a sub-block merge mode;
   based on the determination not to use the sub-block merge mode for the first block, determining whether to use a merge mode with blending for the first block;
   based on the determination to use the merge mode with blending for the first block, coding the first block with the merge mode with blending;
   determining for a second block of the video data whether to use the sub-block merge mode;
   based on the determination to use the sub-block merge mode for the second block, coding the second block of video data with the sub-block merge mode;
   determining for a third block of the video data whether to use the sub-block merge mode;
   based on the determination not to use the sub-block merge mode for the third block, determining whether to use the merge mode with blending for the third block;
   based on the determination not to use the merge mode with blending for the third block, determining whether to use a motion vector difference (MMVD) merge mode for the third block; and
   coding the third block with the MMVD merge mode or a regular merge mode based on the determination whether to use the MMVD merge mode for the third block, wherein the regular merge mode does not use motion vector differences.

2. The method of claim 1, wherein the merge mode with blending is at least one of a geometric mode or a combined inter and intra prediction (CIIP) mode, and wherein determining whether to use the merge mode with blending for the first block comprises determining whether one of the geometric mode or the CIIP mode is to be used or neither of the geometric mode nor the CIIP mode is to be used.

3. The method of claim 2, wherein the geometric mode is a triangular mode.

4. The method of claim 1, further comprising not coding information indicative of whether an MMVD merge mode is enabled for the first block.

5. The method of claim 1, wherein determining whether to use the merge mode with blending for the first block comprises determining whether to use the merge mode with blending at least partially based on a size of the first block.

6. The method of claim 5, wherein the first block has a size of NxM and wherein NxM is greater than or equal to 64.

7. The method of claim 1, wherein coding comprises encoding and the method further comprises signaling a syntax element in a bitstream indicative of using the merge mode with blending for the first block after signaling a syntax element in the bitstream indicative that the sub-block merge mode for the first block is not to be used.

8. The method of claim 1, wherein coding comprises decoding and the method further comprises parsing a syntax element in a bitstream indicative of using the merge mode with blending for the first block after parsing a syntax element in the bitstream indicative that the sub-block merge mode for the first block is not to be used.

9. A device for coding video data, the device comprising:
   a memory for storing the video data; and
   one or more processors implemented in circuitry and communicatively coupled to the memory, the one or more processors being configured to:
   determine for a first block of the video data whether to use a sub-block merge mode;
   based on the determination not to use the sub-block merge mode for the first block, determine whether to use a merge mode with blending for the first block;
   based on the determination to use the merge mode with blending for the first block, code the first block with the merge mode with blending;
   determine for a second block of the video data whether to use the sub-block merge mode;
   based on the determination to use the sub-block merge mode for the second block, code the second block of video data based on the sub-block merge mode;
   determine for a third block of the video data whether to use the sub-block merge mode;
   based on the determination not to use the sub-block merge mode for the third block, determine whether to use the merge mode with blending for the third block;

based on the determination not to use the merge mode with blending for the third block, determine whether to use a motion vector difference (MMVD) merge mode for the third block; and code the third block with the MMVD merge mode or a regular merge mode based on the determination whether to use the MMVD merge mode for the third block, wherein the regular merge mode does not use motion vector differences.

10. The device of claim 9, wherein the merge mode with blending is at least one of a geometric mode or a combined inter and intra prediction (CIIP) mode, and wherein determining whether to use the merge mode with blending for the first block comprises determining whether one of the geometric mode or the CIIP mode is to be used or neither of the geometric mode nor the CIIP mode is to be used.

11. The device of claim 10, wherein the geometric mode is a triangular mode.

12. The device of claim 9, wherein the one or more processors are further configured to not code information indicative of whether an MMVD merge mode is enabled for the first block.

13. The device of claim 9, wherein the one or more processors are configured to determine whether to use the merge mode with blending for the first block by determining whether to use the merge mode with blending at least partially based on a size of the first block.

14. The device of claim 13, wherein the first block has a size of NxM and wherein NxM is greater than or equal to 64.

15. The device of claim 9, wherein code comprises encode and the one or more processors are further configured to signal a syntax element in a bitstream indicative of using the merge mode with blending for the first block after signaling a syntax element in the bitstream indicative that the sub-block merge mode for the first block is not to be used.

16. The device of claim 9, wherein code comprises decode and the one or more processors are further configured to parse a syntax element in a bitstream indicative of using the merge mode with blending for the first block after parsing a syntax element in the bitstream indicative that the sub-block merge mode for the first block is not to be used.

17. A non-transitory computer-readable storage medium having stored thereon instructions that, when executed, cause one or more processors to:

determine for a first block of video data whether to use a sub-block merge mode;

based on the determination not to use the sub-block merge mode for the first block, determine whether to use a merge mode with blending for the first block;

based on the determination to use the merge mode with blending for the first block, code the first block with the merge mode with blending;

determine for a second block of the video data whether to use the sub-block merge mode;

based on the determination to use the sub-block merge mode for the second block, code the second block of video data based on the sub-block merge mode;

determine for a third block of the video data whether to use the sub-block merge mode;

based on the determination not to use the sub-block merge mode for the third block, determine whether to use a merge mode with blending for the third block;

based on the determination not to use the merge mode with blending for the third block, determine whether to use a motion vector difference (MMVD) merge mode for the third block; and code the third block with the MMVD merge mode or a regular merge mode based on the determination whether to use the MMVD merge mode for the third block, wherein the regular merge mode does not use motion vector differences.

18. The non-transitory computer-readable storage medium of claim 17, wherein the merge mode with blending is at least one of a geometric mode or a combined inter and intra prediction (CIIP) mode, and wherein determining whether to use the merge mode with blending for the first block comprises determining whether one of the geometric mode or the CIIP mode is to be used or neither of the geometric mode nor the CIIP mode is to be used.

19. The non-transitory computer-readable storage medium of claim 18, wherein the geometric mode is a triangular mode.

20. The non-transitory computer-readable storage medium of claim 17, wherein the instructions, when executed, further cause the one or more processors to not code information indicative of whether an MMVD merge mode is enabled for the first block.

21. The non-transitory computer-readable storage medium of claim 17, wherein the instructions, when executed, further cause the one or more processors to determine whether to use the merge mode with blending for the first block by determining whether to use the merge mode with blending at least partially based on a size of the first block.

22. The non-transitory computer-readable storage medium of claim 21, wherein the first block has a size of NxM and wherein NxM is greater than or equal to 64.

23. The non-transitory computer-readable storage medium of claim 17, wherein code comprises encode and the instructions, when executed, further cause the one or more processors to signal a syntax element in a bitstream indicative of using the merge mode with blending for the first block after signaling a syntax element in the bitstream indicative that the sub-block merge mode for the first block is not to be used.

24. The non-transitory computer-readable storage medium of claim 17, wherein code comprises decode and the instructions, when executed, further cause the one or more processors to parse a syntax element in a bitstream indicative of using the merge mode with blending for the first block after parsing a syntax element in the bitstream indicative that the sub-block merge mode for the first block is not to be used.

25. The method of claim 1, wherein determining not to use the merge mode with blending for the third block is before determining whether to use the MMVD merge mode for the third block.

26. The device of claim 9, wherein the one or more processors are configured to determine not to use the merge mode with blending for the third block before determining whether to use the MMVD merge mode for the third block.

27. The non-transitory computer-readable storage medium of claim 17, wherein the instructions cause the one or more processors to determine not to use the merge mode with blending for the third block before determining whether to use the MMVD merge mode for the third block.

28. A device for decoding video data, the device comprising:
a memory for storing the video data; and
one or more processors implemented in circuitry and communicatively coupled to the memory, the one or more processors configured to:
determine, for a first block of the video data, whether to use a sub-block merge mode;
based on a determination not to use the sub-block merge mode for the first block, determine to use a merge mode with blending for the first block;
based on the determination to use the merge mode with blending for the first block, determine whether to use a first merge mode with blending or a second merge mode with blending for the first block;
based on a determination to use the first merge mode with blending or the second merge mode with blending, decode the first block with the either the first merge mode with blending or the second merge mode with blending;
determine, for a second block of the video data, whether to use the sub-block merge mode;
based on a determination to use the sub-block merge mode for the second block, decode the second block of video data based on the sub-block merge mode;
determine, for a third block of the video data, not to use the sub-block merge mode;
responsive to the determination not to use the sub-block merge mode for the third block, determine whether to use a merge mode from a normal merge mode group, the normal merge mode group comprising a motion vector difference (MMVD) merge mode and a regular merge mode, or to use a merge mode with blending for the third block;
based on a determination of to use a merge mode from the normal merge mode group for the third block, determine to use the MMVD merge mode or the regular merge mode for the third block; and
decode the third block with either the MMVD merge mode or the regular merge mode, wherein the regular merge mode does not use motion vector differences.

29. The device of claim 28, wherein the first merge mode with blending is a combined inter and intra prediction (CIIP) mode, and the second merge mode with blending is a geometric mode, and wherein the one or more processors are further configured to determine whether one of the CIIP mode or the geometric mode is to be used.

30. The device of claim 28, wherein the one or more processors are further configured to not decode information indicative of whether an MMVD merge mode is used for the first block.

31. The device of claim 28, wherein the one or more processors are further configured to determine whether to use the merge mode with blending based on a size of the first block.

32. The device of claim 31, wherein the first block has a size of NxM and wherein NxM is greater than or equal to 64.

33. The device of claim 9, wherein the one or more processors are further configured to parse a syntax element in a bitstream indicative of using the merge mode with blending for the first block after parsing a syntax element in the bitstream indicative that the sub-block merge mode for the first block is not to be used.

34. A device for coding video data, the device comprising:
a memory for storing the video data; and
one or more processors configured to:
determine for a first block of the video data whether to use a sub-block merge mode;
based on the determination not to use the sub-block merge mode for the first block, determine whether either a first group including a geometric mode and a combined inter and intra prediction (CIIP) mode or a second group including a regular merge mode and a motion vector difference (MMVD) merge mode is to be used;
based on the determination that the first group is to be used for the first block, code the first block with one of the geometric mode or the CIIP mode;
determine for a second block of the video data whether to use a sub-block merge mode;
based on the determination to use a sub-block merge mode for the second block, code the second block of video data based on the sub-block merge mode; determine for a third block of the video data whether to use the sub-block merge mode;
based on the determination not to use the sub-block merge mode for the third block, determine whether either the first group or the second group is to be used for the third block;
based on the determination that the second group is to be used for the third block, determine whether to use the MMVD merge mode for the third block; and
code the third block with the MMVD merge mode or the regular merge mode based on the determination whether to use an MMVD merge mode for the third block.

35. The device of claim 34, wherein the geometric mode is a triangular mode.

36. The device of claim 34, wherein the one or more processors are further configured to not code information indicative of whether an MMVD merge mode is enabled for the first block.

37. The device of claim 34, wherein the one or more processors are configured to determine whether either the first group or the second group is to be used by determining whether either the first group or the second group is to be used at least partially based on a size of the first block.

38. The device of claim 35, wherein the first block has a size of NxM and wherein NxM is greater than or equal to 64.

39. The device of claim 34, wherein code comprises encode and the one or more processors are further configured to:
signal a syntax element in a bitstream indicative of using either the first group or the second group for the first block after signaling a syntax element in the bitstream indicative that the sub-block merge mode for the first block is not to be used.

40. The device of claim 34, wherein code comprises decode and the one or more processors are further configured to:
parse a syntax element in a bitstream indicative of using either the first group or the second group for the first block after parsing a syntax element in the bitstream indicative that the sub-block merge mode for the first block is not to be used.

* * * * *